(12) United States Patent
Nakata

(10) Patent No.: US 7,990,558 B2
(45) Date of Patent: Aug. 2, 2011

(54) INFORMATION PROCESSING APPARATUS AND DATA OUTPUT MANAGEMENT SYSTEM TO RESTRICT PRINTING OPERATIONS

(75) Inventor: Hiroaki Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1152 days.

(21) Appl. No.: 11/682,725

(22) Filed: Mar. 6, 2007

(65) Prior Publication Data

US 2007/0273913 A1 Nov. 29, 2007

(30) Foreign Application Priority Data

Mar. 31, 2006 (JP) ................... 2006-099618

(51) Int. Cl.
*G06F 3/12* (2006.01)
*G06K 15/00* (2006.01)
(52) U.S. Cl. ..................... 358/1.15; 358/1.13
(58) Field of Classification Search ............ 358/1.1, 358/1.8, 1.9, 1.13, 1.14, 1.15, 1.18, 474, 358/468; 713/168, 169, 170, 171
See application file for complete search history.

(56) References Cited

U.S. PATENT DOCUMENTS

| | | | |
|---|---|---|---|
| 7,305,556 B2* | 12/2007 | Slick et al. | 713/169 |
| 7,321,435 B2* | 1/2008 | Cherry et al. | 358/1.14 |
| 2003/0151762 A1* | 8/2003 | Cherry et al. | 358/1.14 |
| 2004/0080772 A1* | 4/2004 | Snyders | 358/1.14 |
| 2005/0174609 A1* | 8/2005 | Thurlow | 358/425 |

FOREIGN PATENT DOCUMENTS

| | | |
|---|---|---|
| CN | 1601972 A | 3/2005 |
| EP | 1320008 A2 | 6/2003 |
| EP | 1427166 A2 | 6/2004 |
| JP | 2004-185629 A | 7/2004 |

* cited by examiner

*Primary Examiner* — Gabriel I Garcia
(74) *Attorney, Agent, or Firm* — Canon U.S.A., Inc. I.P. Division

(57) ABSTRACT

An information processing apparatus acquires print data to be printed by a printing apparatus and restriction information for restricting an output process of the print data. The information processing apparatus converts a format of the acquired print data and the restriction information based on information regarding a processing capability of the printing apparatus. Then, the information processing apparatus sends the print data and the restriction information, the format of which has been converted, to the printing apparatus.

14 Claims, 9 Drawing Sheets

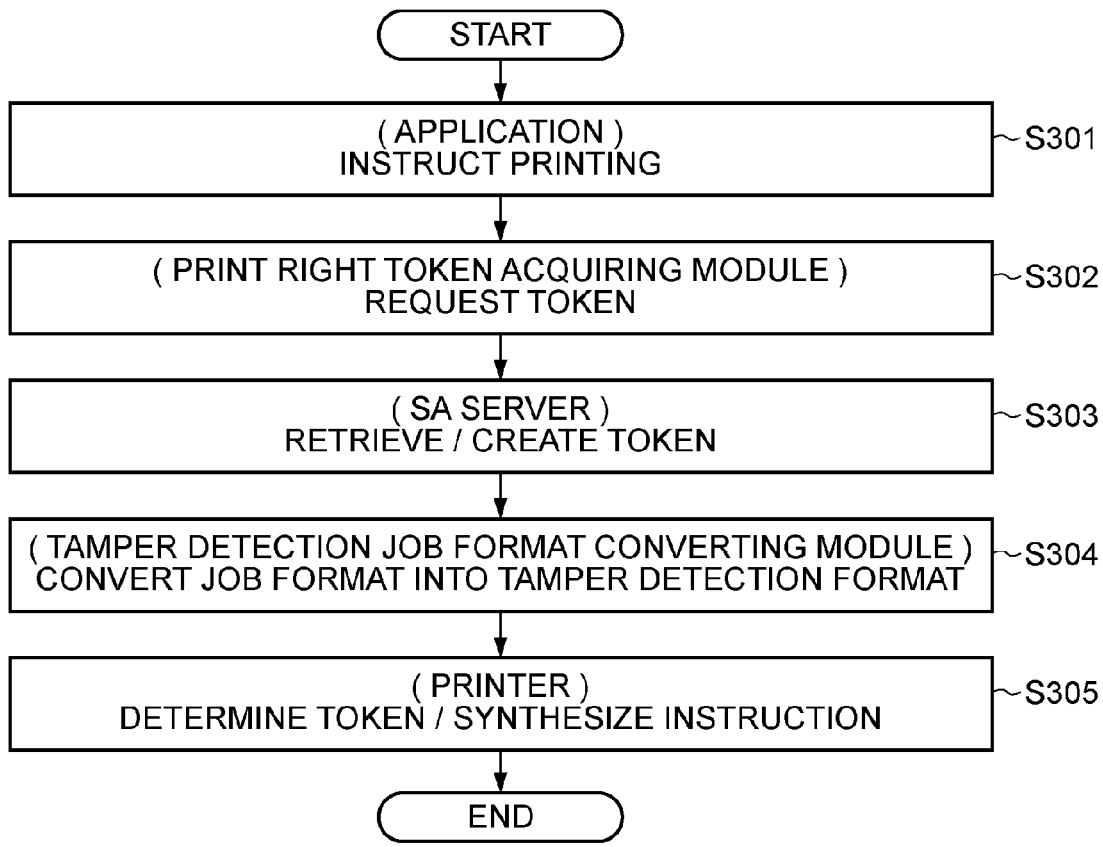
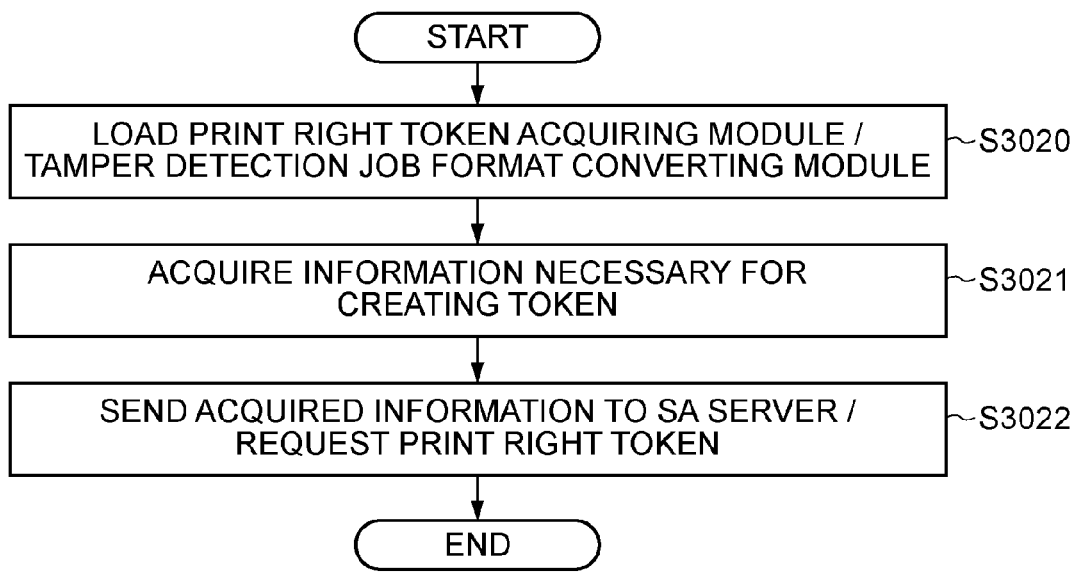

FIG. 8A

PRINT RIGHT TOKEN INFORMATION TABLE
FOR EACH USER

| User | Duplex | Nup | Color |
|---|---|---|---|
| (default) | Off | 1 | RGB |
| userA | Off | 2 | BW |
| userB | On | 4 | RGB |
| ⋮ | ⋮ | ⋮ | ⋮ |

FIG. 8B

TAMPER DETECTABLE JOB PROCESSING
CAPABILITY TABLE FOR EACH PRINTER

| Printer | SecureJob |
|---|---|
| (default) | FALSE |
| prnA | TRUE |
| prnB | FALSE |
| ⋮ | ⋮ |

INFORMATION PROCESSING APPARATUS AND DATA OUTPUT MANAGEMENT SYSTEM TO RESTRICT PRINTING OPERATIONS

BACKGROUND OF THE INVENTION

1. Field of the Invention

The present invention generally relates to a system restricting printing operations or the like.

2. Description of the Related Art

Recently, in systems restricting printing operations, a reduction of a total cost of ownership (TCO), including not only an initial cost for introducing printers and systems but also a cost for supplies such as printing sheets and coloring agents as represented by toners, has received significant attention for reducing office costs or for promoting global environmental conservation.

When a printer is installed in an office, anyone can perform a printing operation using the printer if they can access a network, which has been a problematic issue. Since anyone can perform a printing operation without any restrictions with regard to the number of printed sheets and users have no imposed limits, printing operations are often performed in which the number of printing sheets exceeds the necessary quantity. This undesirably results in an increase in office costs.

When considering this issue from a viewpoint of administrators of systems or devices, it is desired to set available functions and limitations on the available number of sheets for each user in an integrated fashion and to manage quantities of resources. For example, the number of sheets that each user can consume may be limited to an appropriate level.

To cope with such issues, many printing systems implementing restrictions of printing operations or management of the number of printing sheets are realized. For example, a printing system realizes restrictions of printing operations using address information, such as IP addresses of transmission control protocol/internet protocol (TCP/IP), which is a first method. Another system realizes management of the number of printing sheets by acquiring a print operation log, which is a second method. However, since the first method is a simplistic method for imposing restrictions on specific IP addresses, strict management, such as imposing restrictions on the number of sheets that specific users can use, cannot be performed. In addition, according to the second method, a log can be preserved by printing the log. However, administrators have to monitor the log all of the time to investigate whether unauthorized printing operations have been performed, which requires a significant personnel cost. For this reason, the second method deviates from the spirit of the TCO reduction.

To address the above-described issues, for example, an invention disclosed in Japanese Patent Laid-Open No. 2004-185629 has been suggested. The invention disclosed in Japanese Patent Laid-Open No. 2004-185629 is designed to restrict output operations. More specifically, a management server on a network creates a "print right token" for each user, and delivers the print right token to a host computer used by each user prior to the printing operation. An image forming apparatus (e.g., a printer driver) in the host computer sends the acquired print right token together with a print job. An image processing apparatus (e.g., a printer) restricts the number of output sheets and functions according to information written in the print right token that the image processing apparatus has received together with the print job.

Furthermore, to prevent the print right token from being tampered with and function restrictions for each user from being intentionally cancelled in the above-described systems, a printing system that sends an entire print job including a print right token in a format enabling tamper detection is under development. Even if a print job having been tampered with by a malicious user is sent, this printing system can detect the tampering and discard the printing request.

However, printing systems capable of receiving a print job in a tamper detectable format and processing the print job are limited to those having a tamper detection processing function. Even printers of a related series sharing a specification of the same printer description language (PDL) may not be utilized by users as printers included in the printing system. In addition, even if a printer included in a printing system is capable of handling a print job in a tamper detectable format, there may be a case where the printing system is desired to work in cooperation with other printing solutions, such as, for example, a system that archives and stores print jobs in a storage device. In such a case, the printer has to work after switching a working mode into a mode enabling processing of jobs in a normal format but not in a tamper detectable format, which may also be problematic.

SUMMARY OF THE INVENTION

An aspect of the present invention allows imposing of restrictions on data output regardless of processing capabilities of data output apparatuses.

According to an aspect of the present invention, an embodiment is directed to an information processing apparatus connectable to a data output apparatus (e.g., printing apparatus) through a communication line. The information processing apparatus includes an acquiring unit, a converting unit, and a sending unit. The acquiring unit is configured to acquire output data (e.g., print data) to be output (e.g., printed) by the data output apparatus and restriction information (e.g., print right token) for restricting an output process of the output data. The converting unit is configured to convert a format of the output data and the restriction information acquired by the acquiring unit according to information regarding a processing capability of the data output apparatus. The sending unit is configured to send the output data and the restriction information, the format of which has been converted by the converting unit, to the data output apparatus.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 5 is a flowchart illustrating an outline of an entire printing operation according to an exemplary embodiment of the present invention.

FIG. 6 is a flowchart illustrating an example of a detailed operation performed at STEP S302 of a flowchart shown in FIG. 5.

FIG. 8A is a diagram illustrating an example of a table in a print right token information database in a directory server, whereas FIG. 8B is a diagram illustrating an example of a tamper detection job processing capability table for each printer.

DESCRIPTION OF THE EMBODIMENTS

Exemplary embodiments of the present invention will be described in detail below with reference to the accompanying drawings.

Figure 1:
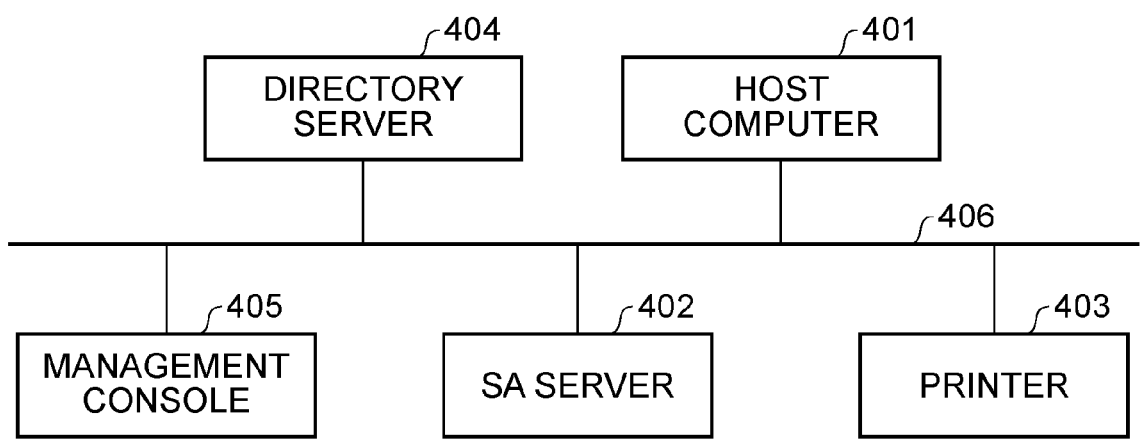
FIG. 1 is a block diagram illustrating an example of a configuration of a printing system according to an exemplary embodiment of the present invention.

FIG. 1 is a block diagram illustrating an example of a configuration of a printing system according to an exemplary embodiment of the present invention. Referring to FIG. 1, a host computer 401 is used by users to generate image data and print images. A security agent (SA) server 402 delivers a print right token to the host computer 401. A printer 403 receives print data via a network and prints images corresponding to the received print data on sheets utilizing suitable printing technologies, such as electrophotographic technologies and inkjet technologies. A directory server 404 has a print right information database on the basis of which the print right token is created. A management console 405 is a computer that allows management of the database established in the directory server 404. The host computer 401, the SA server 402, the printer 403, the directory server 404, and the management console 405 are connected to each other via a network 406, such as an Ethernet® network.

Figure 2:
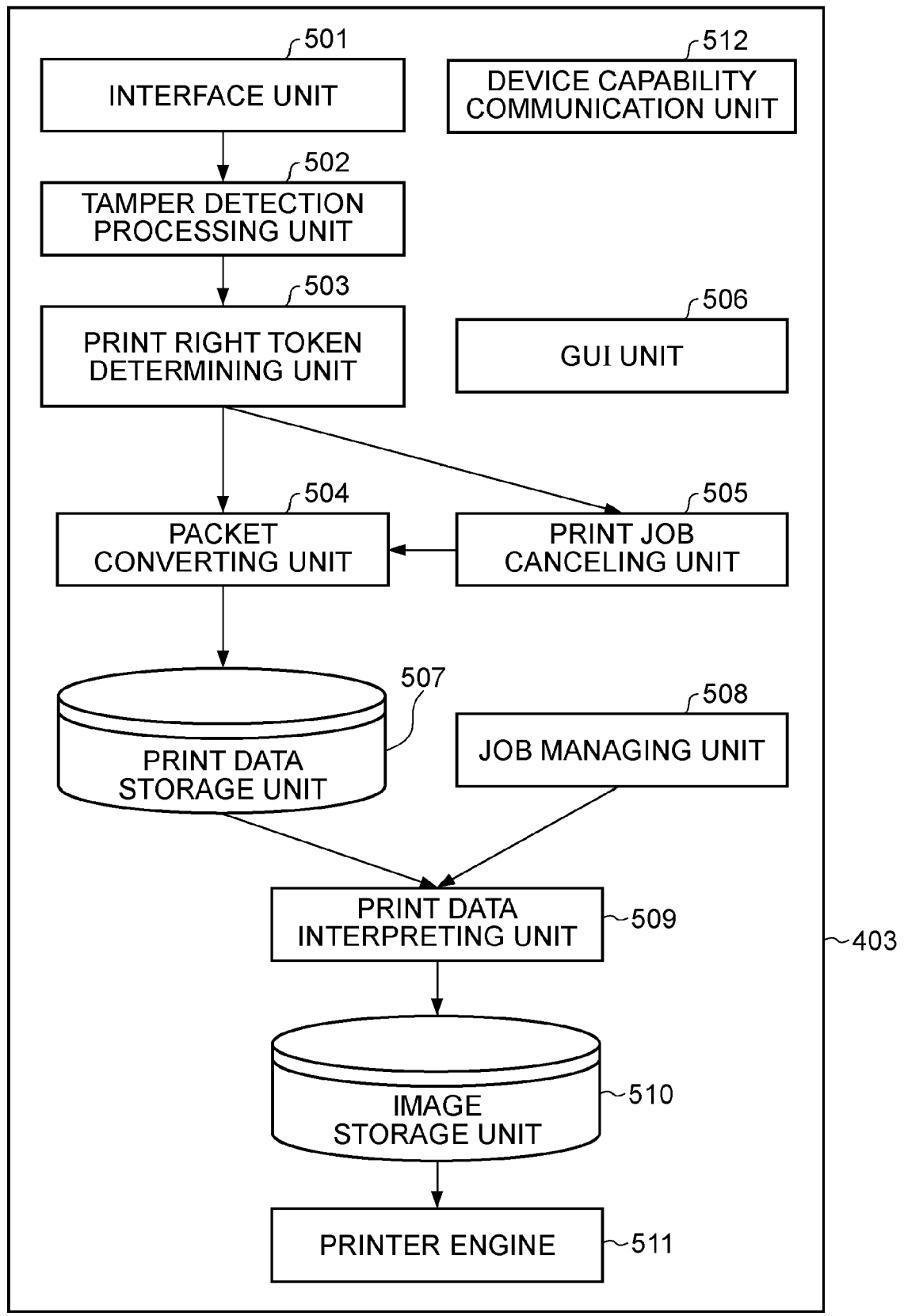
FIG. 2 is a block diagram illustrating an example of a detailed configuration of a printer according to an embodiment of the present invention.

FIG. 2 is a block diagram illustrating an example of a detailed configuration of the printer 403 according to an embodiment of the present invention. Referring to FIG. 2, an interface unit 501 establishes connection to the network 406 and receives a print job from the host computer 401. A tamper detection processing unit 502 processes a print job in a tamper detectable format to determine whether or not the print job has been tampered with. A print right token determining unit 503 identifies the format of the received print job and determines whether or not a print right token has been granted to the job. A packet converting unit 504 synthesizes an instruction for the print job on the basis of the printing restriction information when a print right token has been granted to the job, and informs a subsequent stage of the instruction.

A print job canceling unit 505 instructs canceling of a printing operation corresponding to a print job to which a print right token is not granted. In addition, the print job cancelling unit 505 instructs cancelling of a printing operation corresponding to a print job having print data (i.e., page description language (PDL) data) which contains an attribute for canceling the printing operation.

A graphical user interface (GUI) unit 506 allows users to activate operations of the print job canceling unit 505 with an operation panel (not shown). A print data storage unit 507 temporarily stores the PDL data. A job managing unit 508 temporarily stores output attribute information, such as the number of pages to be printed and color information, contained in the print job.

A print data interpreting unit 509 acquires the PDL data from the print data storage unit 507 and performs an image generation operation to generate image data according to the attribute information stored in the job managing unit 508.

An image storage unit 510 temporarily stores the image data generated by the print data interpreting unit 509 until the completion of the printing operation. A printer engine 511 prints the image data stored in the image storage unit 510 on media, such as printing sheets, using known printing technologies, such as electrophotographic technologies and inkjet technologies.

A device capability communication unit 512 responds to a request inquiring about the capability of the device sent from external devices, such as simple network management protocol (SNMP) devices. The print data storage unit 507 and the image storage unit 510 may be constituted by a secondary storage device, such as a mass hard disk. However, the present invention is not limited to such a physical configuration.

Figure 3:
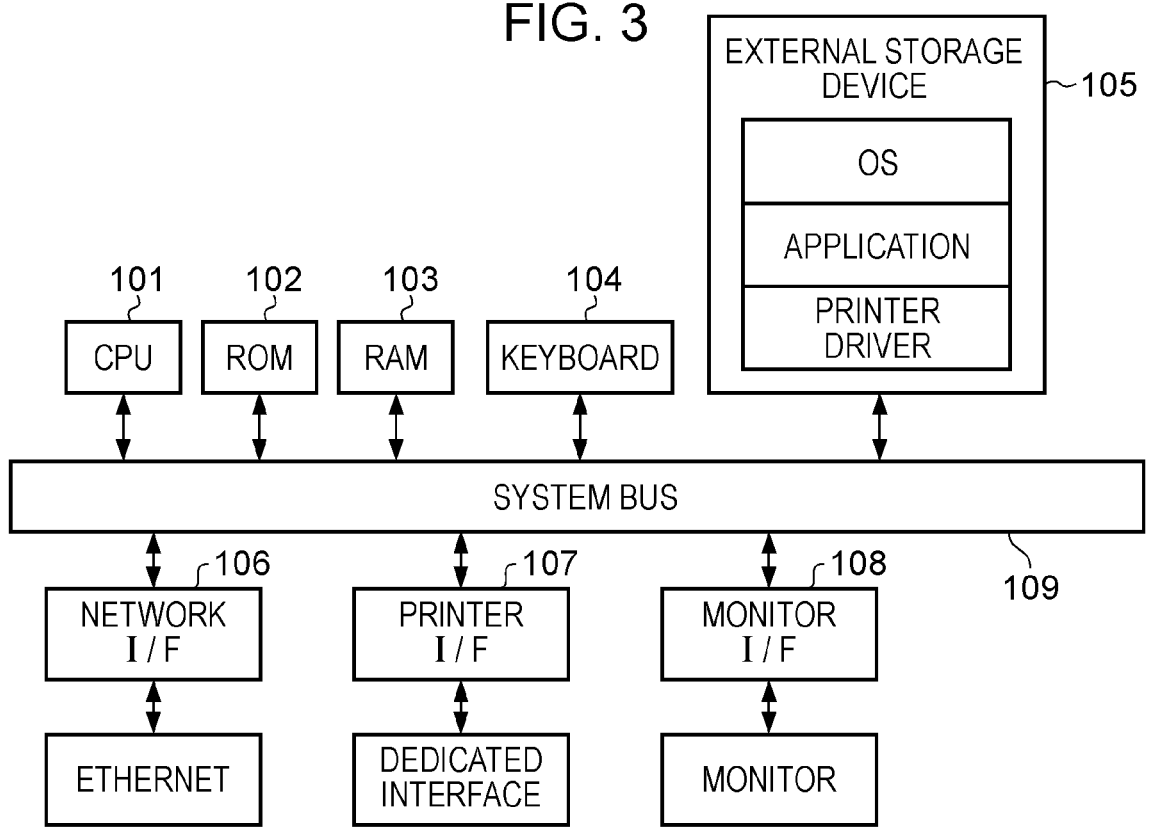
FIG. 3 is a block diagram illustrating an example of a configuration of an internal system of a host computer according to an embodiment of the present invention.

FIG. 3 is a block configuration diagram illustrating an example of an internal system of the host computer 401 according to an embodiment of the present invention. A central processing unit (CPU) 101 controls the entire apparatus according to programs stored in a read only memory (ROM) 102, a random access memory (RAM) 103, or an external storage device 105. The RAM 103 is used as a work area when the CPU performs various operations. The external storage device 105 stores an operating system (OS), application software, printer driver software, and the like. Input devices, such as a keyboard 104 and a mouse (not shown), are used by users to give various instructions. A network interface (I/F) 106 and a printer I/F 107 are connected to the printer 403 through Ethernet® or a dedicated interface to exchange data. A monitor I/F 108 is connected to a monitor to transfer display data. In addition, a common data bus (i.e., a system bus) 109 is also shown.

Figure 4:
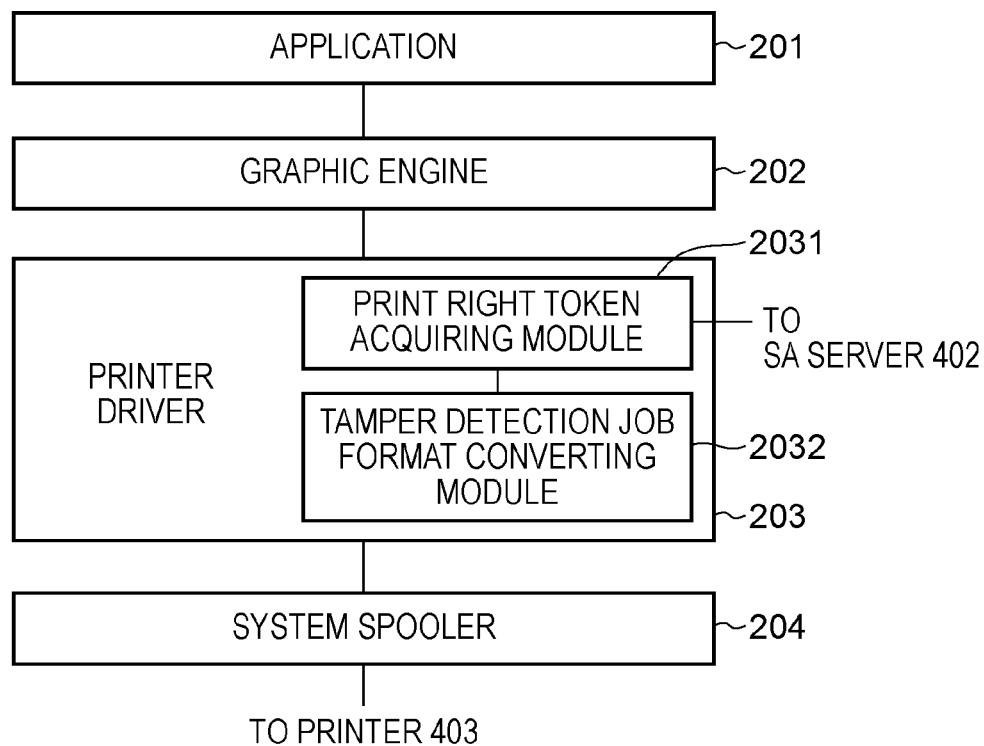
FIG. 4 is a block diagram illustrating an example of a detailed configuration used for a printing operation in a host computer according to an embodiment of the present invention.

FIG. 4 is a block diagram illustrating an example of a detailed configuration used for the printing operation in the host computer 401 according to an embodiment of the present invention. An application 201, a graphic engine 202, a printer driver 203, and a system spooler 204 exist as files stored in the external storage device 105. The application 201, the graphic engine 202, the printer driver 203, and the system spooler 204 are program modules that are loaded into the RAM 102 and executed by the OS or other modules utilizing these modules.

In addition, the application 201 and the printer driver 203 may be added to a hard disk of the external storage device 105 from a floppy disk in the external storage device 105, a compact disc-read only memory (CD-ROM) (not shown), or through a network (not shown). The application 201 stored in the external storage device 105 is loaded into the RAM 103 and executed. When the printer 203 performs the printing operation according to instructions given from the application 201, the data output (i.e., drawing) is performed utilizing the graphic engine 202, which is loaded into the RAM 103 and brought into an executable state as in the case of the application 201.

The graphic engine 202 loads the printer driver 203 prepared for each printer from the external storage device 105 to the RAM 103, and sets the output from the application 201 in the printer driver 203. In addition, the graphic engine 202 converts a graphic device interface (GDI) function received from the application 201 into a device driver interface (DDI) function, and outputs the DDI function to the printer driver 203.

The printer driver 203 converts the print data into PDL data on the basis of the DDI function received from the graphic engine 202. The PDL data is a control command recognizable by the printer 403. The converted PDL data is output to the printer 403 as a print job through the system spooler 204, which is loaded into the RAM 103 by the OS, and the printer I/F 107.

Additionally, in the printing system according to an exemplary embodiment, the printer driver 203 includes a print right token acquiring module 2031 and a tamper detection job format converting module 2032. The print right token acquiring module 2031 and the tamper detection job format converting module 2032 may be built-in modules of the printer driver 203 or library modules which are added by individual installation.

Upon the printer driver 203 being executed to perform the printing operation, the printer driver 203 loads the print right token acquiring module 2031 and the tamper detection job format converting module 2032. The print right token acquiring module 2031 collects information, such as printer names and user names, necessary for acquiring the print right token in the host computer 401, and sends the information to the SA server 402. The print right token acquiring module 2031 then receives the print right token from the SA server 402 as a response.

The tamper detection job format converting module 2032 combines the PDL data sent from the printer driver 203 with the print right token, and reads out information about a capability of processing a tamper detection job of the printer written in the print right token as the output destination. If the destination printer has the capability of processing the tamper detection job, the tamper detection job format converting module 2032 sends the print job to the printer 403 through the printer driver 203 and the system spooler 204 after converting a format of the print job into a tamper detectable job format. The print job is the combined data of the PDL data and the print right token. If the printer 403 does not have the capability of processing the tamper detection job, the tamper detection job format converting module 2032 sends the print job to the printer 403 without converting the format of the print job. Here, the term "combine" means to add the print right token to the PDL data.

FIG. 5 is a flowchart illustrating an outline of an entire printing operation according to the exemplary embodiment. At STEP S301, a user of the host computer 401 instructs a printing operation through a print dialog of the application 201.

Then, at STEP S302, the printer driver 203, which has been loaded for the printing operation, further loads the print right token acquiring module 2031. The print right token acquiring module 2031 collects the information necessary for acquiring the print right token on the host computer 401, and sends the information to the SA server 402, thereby requesting the SA server 402 to create the print right token.

Next, at STEP S303, the SA server 402 acquires print right token information from the print right token information database implemented in the directory server 404 using the information received from the print right token acquiring module 2031 as a retrieval key. The SA server 402 then creates the print right token on the basis of the acquired information, and sends the print right token to the print right token acquiring module 2031.

Subsequently, at STEP S304, the tamper detection job format converting module 2032 combines the PDL data sent from the printer driver 203 with the print right token acquired by the print right token acquiring module 2031 to create the print job. The tamper detection job format converting module 2032 then reads out the information about the capability of processing the tamper detection job of the printer written in the print right token as the output destination. After reading out the information about the capability of processing the tamper detection job, if the printer has the capability of processing the tamper detection job, the tamper detection job format converting module 2032 sends the print job to the printer 403 through the printer driver 203 and the system spooler 204 after converting the format of the print job into the tamper detectable job format. If the printer does not have the capability of processing the tamper detection job, the tamper detection job format converting module 2032 sends the print job to the printer 403 without converting the format of the print job.

Lastly, at STEP S305, upon receiving the print job, the printer 403 detects whether the print job has been tampered with if the format of the job is in the tamper detectable format. If the print job has not been tampered with, the printer 403 further determines whether or not the print right token has been combined with the PDL data. If the print right token has been combined, the printer 403 synthesizes an instruction for the print job according to the description of the print right token, and performs the printing operation in a restricted format.

FIG. 6 is a flowchart illustrating a detailed operation performed at STEP S302 of the flowchart shown in FIG. 5. Firstly, at STEP S3020, the printer driver 203, having been loaded for the printing operation, loads the print right token acquiring module 2031 and the tamper detection job format converting module 2032.

Then, at STEP S3021, the print right token acquiring module 2031 acquires the information necessary for acquiring the print right token, such as information on the output destination printer and account information of a user instructing the printing operation.

Here, the printer information corresponds to information uniquely identifying the printer 403. More specifically, the printer information may be a host name (i.e., a domain name server (DNS) name) of the output destination printer 403 in the network.

In addition, the user account information corresponds to user identification information used by the user instructing the printing operation to log in the host computer 401. For example, the user account information may be a domain account used in units of network called a domain. The printer information and the user account information can be acquired using application program interfaces (APIs) or the like provided by the OS.

Then, at STEP S3022, the print right token acquiring module 2031 sends information acquired at STEP S3021 to the SA server 402 to request the creation and sending of the print right token.

Communication between the print right token acquiring module 2031 and the SA server 402 is performed using a protocol of a known technology, such as a transmission control protocol (TCP), a user datagram protocol (UDP), or a simple object access protocol (SOAP). More specifically, information to be sent and the data indicating the instruction are written in a predetermined format (e.g., a binary format having serialized structure data and an extensible markup language (XML) format). Then, the written data is divided into units of data called packets suitable for the transfer utilizing the APIs provided by the OS. The packets are transmitted and exchanged over the network 406. Hereinafter, the communication is performed between the computers 404 and 405 and each node of printers, i.e., a sender and a receiver of the communication, via the network 406 using the same protocol as that described at STEP S3022.

Figure 7:
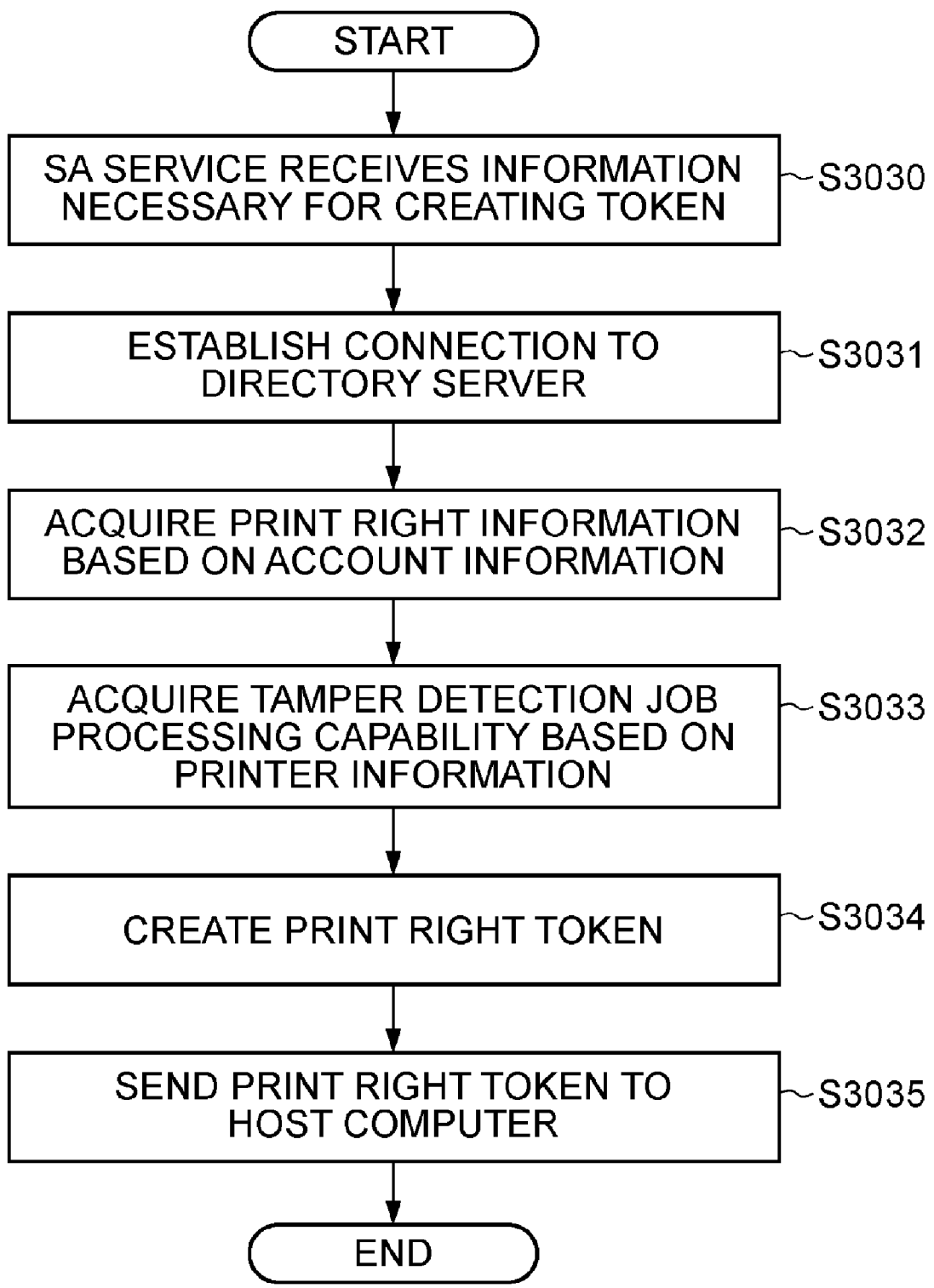
FIG. 7 is a flowchart illustrating an example of a detained operation performed at STEP S303 of a flowchart shown in FIG. 5.

FIG. 7 is a flowchart illustrating a detailed operation performed at STEP S303 of the flowchart shown in FIG. 5. An entity of the exemplary embodiment in the SA server 402 is a process called an SA service that works on the SA server 402. Herein, the SA server 402 and the SA service are not distinguished from each other, and, hereinafter, are commonly called the SA server 402 for ease of explanation. The SA service is a program controlling the CPU 101 shown in FIG. 3. The CPU 101 performs steps shown in FIG. 7 according to the SA service.

Firstly, at STEP S3030, the SA server 402 receives the information necessary for the creation of the print right token from the host computer 401 via the network 406.

Then, at STEP S3031, the SA server 402 establishes a connection to the directory server 404. More specifically, at this step, the SA server 402 establishes a connection to the directory server 404 and performs an initialization operation necessary to perform a retrieval operation on the print right token information database implemented in the directory server 404. For example, in a case where an active directory system is used as the directory server 404, interfaces called active directory service interfaces (ADSI) are used to access the active directory database. At STEP S3031, the initialization operation of the ADSI is performed.

Next, at STEP S3032, the SA server 402 retrieves the print right token information corresponding to the key from the directory server 404 using the user account information as the retrieval key. The SA server 402 then stores the print right token information in a storage area in the SA server 402.

FIG. 8A is a diagram illustrating an example of a table contained in the print right token information database, which is stored in the directory server 404. Here, more specifically, the print right token information may be combination of three types of information, e.g., Duplex (duplex printing), Nup (Nup printing), and Color (color or monochrome printing) as shown in the table. A value of the Duplex can be set at Off (duplex printing does not have be performed or may be performed) or On (duplex printing has to be performed). The value ON imposes a stronger restriction. A value of the Nup may be set at 1 (1, 2, 4, 6, 9, and 16 up are available), 2 (2, 4, 6, 9, and 16 up are available), 4 (4, 6, 9, and 16 up are available), 6 (6, 9, and 16 up are available), 9 (9 and 16 up are available), or 16 (only 16 up is available). The value cited in the later part has a stronger restriction. The value of the Color may be set at RGB (color printing or monochrome printing may be performed) or BW (monochrome printing has to be performed), and the value of BW imposes a stronger restriction. In addition, there may be also a case where none of values of the information are specified (written using a symbol "–").

Editing operations can be performed on the print right token information using a management program with a user interface that is executed on the management console 405. More specifically, the editing operations correspond to modification operations, such as addition and deletion of a retrieval key and print right token information to and from the table and modification of the existing print right token information. In a case where the directory server 404 is realized as the active directory system, these modification operations are realized using the ADSI interfaces.

For example, suppose that the user name of the user performing the printing operation is "userA". At STEP S3032, after performing the retrieval operation using a retrieval key "userA", the directory server 404 returns the information of "Duplex.Off, Nup.2, Color.BW", which is the print right token information of "userA" retrieved from the print right token information table for each user as a retrieval result. Thus, the SA server 402 stores the resulting print right token information in the storage area therein.

Then, the SA server 402 retrieves a tamper detection job processing capability table for each printer using the printer information as a retrieval key at STEP S3033. The SA server 402 acquires the tamper detection job processing capability information resulting from the retrieval operation and stores the information in the storage area of the SA server 402.

FIG. 8B is a diagram illustrating an example of a tamper detection job processing capability table for each printer stored in the directory server 404. More specifically, an item "SecureJob" (TRUE or FALSE) is included in the table. A value TRUE indicates that the printer has the capability of processing the tamper detection job. If a function of the tamper detection is set to be valid on a setting screen of the GUI unit 506 or the like in the printer having the tamper detection job processing capability, the value of SecureJob, i.e., the capability of processing the tamper detection job, is set to TRUE. On the other hand, if the function of the tamper detection is set to be invalid to allow the printer to work in cooperation with another printing solution, e.g., another printing system that archives jobs, the value of SecureJob is set to FALSE. In addition, when the printer does not naturally have the function, the value of SecureJob is set to FALSE. For example, suppose that a host name of the destination printer is "prnA". The SA service 402 retrieves the table using a retrieval key "prnA", and stores the "SecureJob.TRUE", resulting from the retrieval operation, in the storage area.

Then, at STEP S3034, the SA server 402 creates the print right token on the basis of the print right token information and the tamper detection job processing capability information stored in the storage area.

The print right token is data to be sent ultimately to the printer 403 with the PDL data through the print right token acquiring module 2031 in the exemplary embodiment, and plays three main roles. A first role is informing the tamper detection job format converting module 2032 of whether the printer 403 is capable of processing the tamper detection job. A second role is helping the printer 403 to decide whether to permit or reject the print request from the host computer 401. In this system, if a print right token is not attached to the print job, the printing operation is inhibited. In addition, a third role is informing the printer 403 of the information regarding restrictions of the printing functions. The printer 403 synthesizes the setting of the print job according to the print function restriction information informed by the print right token so that images are output in a restricted format.

Figure 9:
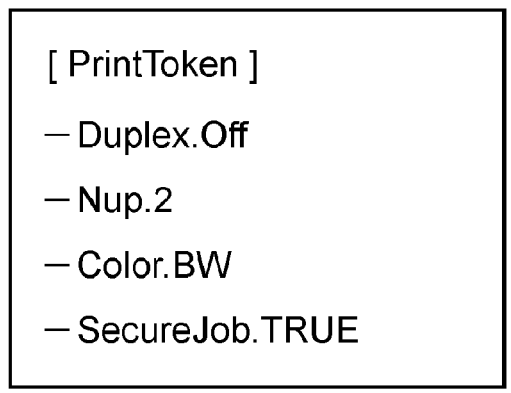
FIG. 9 is a diagram illustrating an example of a print right token created after STEPs S3032 and S3033.

FIG. 9 is a diagram illustrating an example of the print right token created after STEPs S3032 and S3033. Here, each set value is written in a natural language symbolically. However, in practice, each value is represented in a format (e.g., binary data such as a job language) interpretable by the tamper detection job format converting module 2032 and the printer 403.

Lastly, at STEP S3035, the SA server 402 sends the created print right token to the print right token acquiring module 2031.

Figure 10:
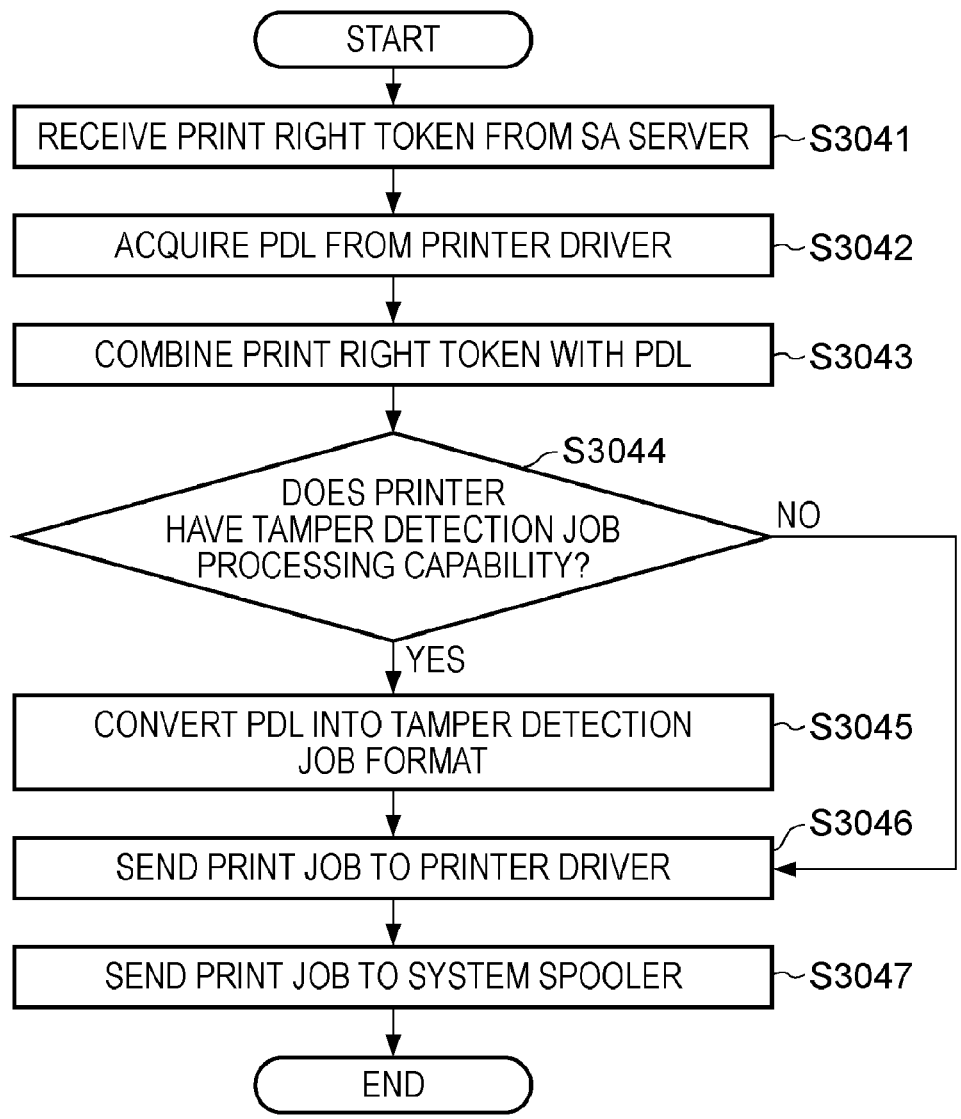
FIG. 10 is a flowchart illustrating an example of a detailed operation performed at STEP S304 of a flowchart shown in FIG. 5.

FIG. 10 is a flowchart illustrating a detailed operation performed at STEP S304 of the flowchart shown in FIG. 5. Firstly, at STEP S3041, the print right token acquiring module 2031 receives the print right token sent from the SA server 402.

Next, at STEP S3042, the tamper detection job format converting module 2032 acquires the PDL data from the printer driver 203. The PDL data is data, in a format interpretable by the printer 403, converted by the printer driver 203 from a drawing instruction of the application 201 sent through the graphic engine 202.

Then, at STEP S3043, the tamper detection job format converting module 2032 combines the received print right token with the acquired PDL data. That is, the tamper detection job format converting module 2032 connects two kinds of binary data in a format interpretable by the printer 403.

Subsequently, at STEP S3044, the tamper detection job format converting module 2032 determines whether the output destination printer can process the job in the tamper detectable format with reference to the information about "SecurePrint" included in the print right token. If the printer is determined to be able to process the job (YES in STEP S3044), the process proceeds to STEP S3045. Otherwise (NO in STEP S3044), the process proceeds to STEP S3046.

Next, at STEP S3045, the tamper detection job format converting module 2032 converts the format of the PLD data combined with the print right token into the tamper detectable job format. Here, more specifically, the tamper detectable job format means a format having a header and a footer attached in front of and behind the binary data, for example. The header contains signature information that indicates that the job is in the format enabling the tamper detection. The footer contains hash value information serving as a checksum that indicates the PDL data is tamper-free.

Then, at STEP S3046, the tamper detection job format converting module 2032 sends the print job whose format is or is not converted into the tamper detectable job format to the printer driver 203.

Lastly, at STEP S3047, the printer driver 203 further sends the print job to the printer 403 through the system spooler 204.

Figure 11:
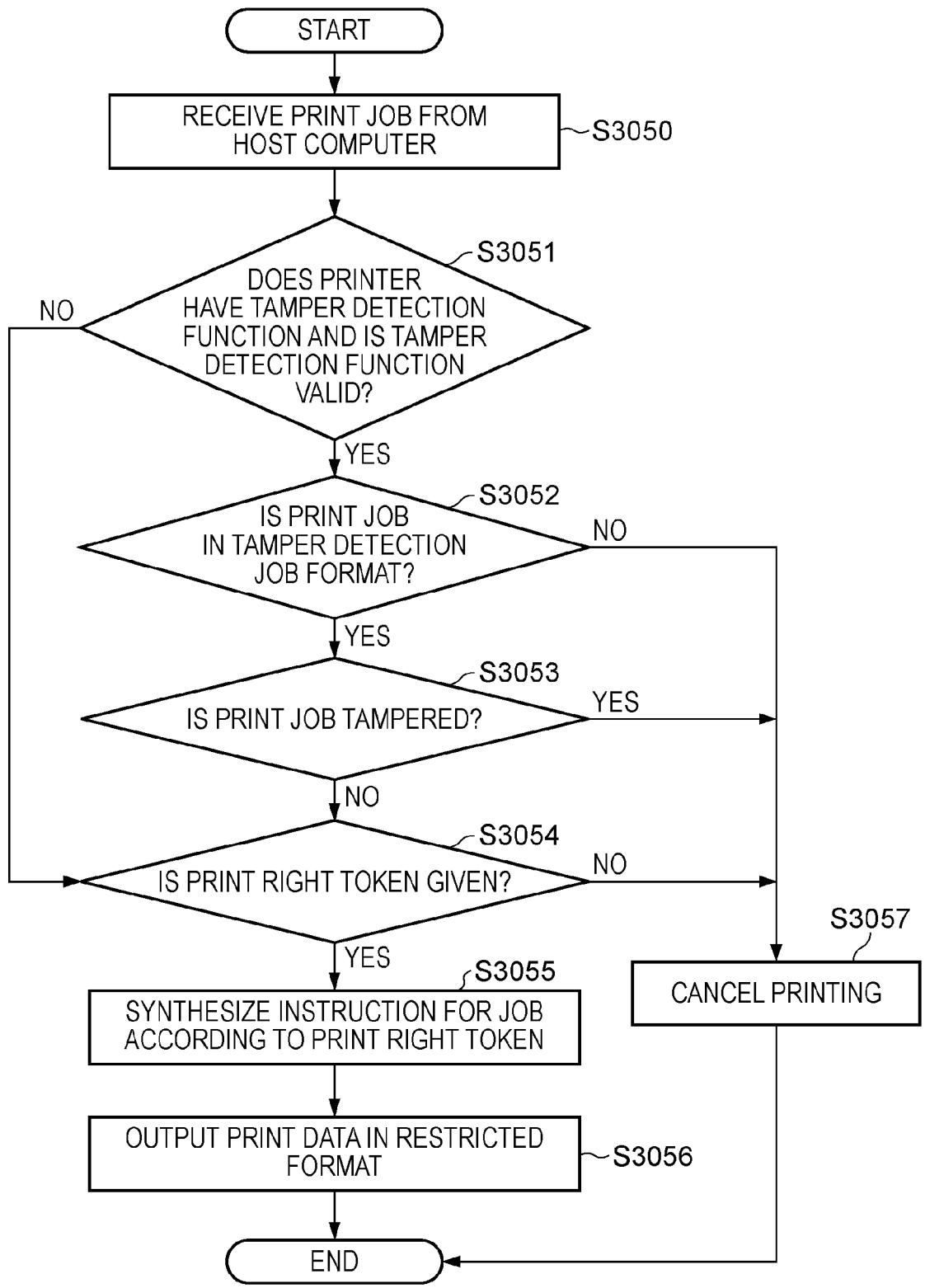
FIG. 11 is a flowchart illustrating an example of a detailed operation performed at STEP S305 of a flowchart shown in FIG. 5.

FIG. 11 is a flowchart illustrating a detailed operation performed at STEP S305 of the flowchart shown in FIG. 5.

Firstly, at STEP S3050, the interface unit 501 of the printer 403 receives the print job from the host computer 401.

Then, at STEP S3051, the interface unit 501 determines whether or not the printer 403 has the tamper detection function and whether or not the function is currently set to be valid. If the printer 403 has the function and the function is set to be valid (YES in STEP S3051), the process proceeds to STEP S3052. Otherwise (NO in STEP S3051), the process proceeds to STEP S3054.

Subsequently, at STEP S3052, the tamper detection processing unit 502 acquires the print job from the interface unit 501 and determines whether or not the job is in the tamper detectable job format. More specifically, the tamper detection processing unit 502 analyzes the signature data, indicating that the job is in the format enabling the tamper detection, contained in the header. After analyzing the signature data, if the print job is determined to be in the tamper detectable job format (YES in STEP S3052), the process proceeds to STEP S3053. Otherwise (NO in STEP S3052), the process proceeds to STEP S3057, and the printing operation is canceled.

Next, at STEP S3053, the tamper detection processing unit 502 analyzes whether the print job is tampered with or not. To put it briefly, in the tamper detection operation, the tamper detection processing unit 502 compares the hash value contained in the footer of the print job in the tamper detectable format with that calculated from the print data. As a result, it is possible to detect the tampering even if the print right token included in the print job is tampered with by a malicious user so that the restrictions imposed on the printing functions are reduced. As the result of the analysis, if it turns out that the job is not tampered with (NO in STEP S3053), the process proceeds to STEP S3054. Otherwise (YES in STEP S3053), the process proceeds to STEP S3057, and the printing operation is cancelled.

Subsequently, at STEP S3054, the print right token determining unit 503 analyzes the print job having undergone the processing performed at STEP S3051 or S3053 to extract the data of the print right token. As a result of the analysis, if the print right token can be extracted (YES in STEP S3054), the process proceeds to STEP S3055. Otherwise (NO in STEP S3054), the process proceeds to STEP S3057, and the printing operation is cancelled.

Next, at STEP S3055, the packet converting unit 504 interprets the print right token extracted at STEP S3054. According to the information about the restrictions imposed on the printing functions contained in the print right token, the packet converting unit 504 rewrites the print job so as to synthesize an instruction for the print job. For example, in terms of the color print setting among the print function restriction information contained in the print right token shown in FIG. 9, the packet converting unit 504 mandatorily changes a printing setting to the monochrome printing and synthesizes the instruction even if the print data includes color data or a user has given an instruction for color printing.

Lastly, at STEP S3056, the packet converting unit 504 sends the print data to the printer engine 511 through the print data storage unit 507, the print data interpreting unit 509, and the image storage unit 510. The printer engine 511 eventually prints an image corresponding to the print data in a restricted format.

Figure 12:
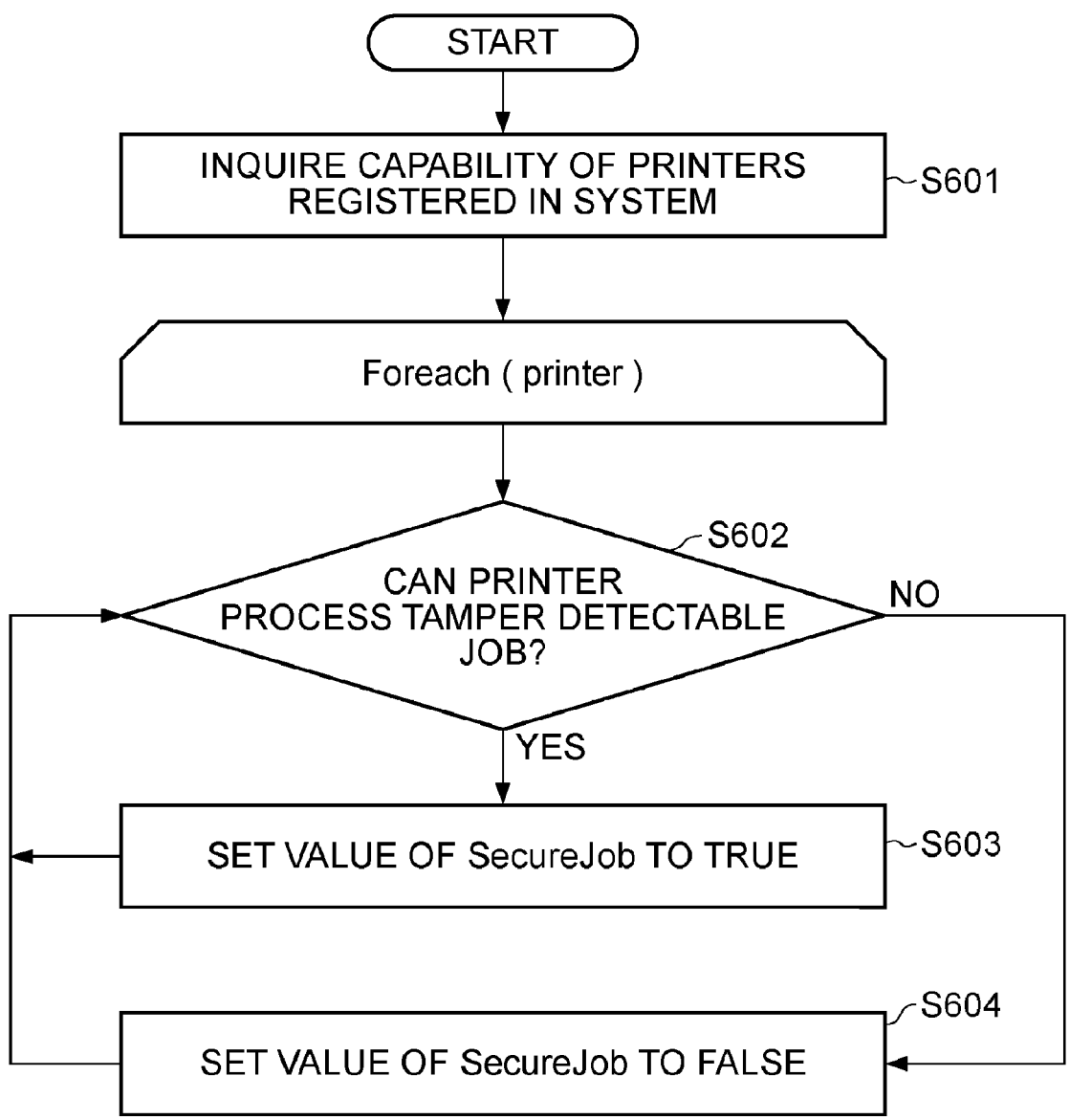
FIG. 12 is a flowchart illustrating an operation performed when an administrator of a printing system automatically sets tamper detection job processing capability information in a print right management token stored in a directory server through a management console.

FIG. 12 is a flowchart illustrating an example of an operation performed when an administrator of a printing system according to the exemplary embodiment automatically sets the tamper detection job processing capability information in the print right management token stored in the directory server 404 with the management console 405.

Firstly, the administrator of the printing system instructs application that works on the management console 405 to perform the setting operation using a user interface or the like (not shown). This causes the management console 405 to access the directory server 404 to inquire the capability of each of the printers, in the network, registered in the tamper detection job processing capability table for each printer using a protocol, such as a simple network management protocol (SNMP) at STEP S601.

Then, at STEP S602, if the management console 405 determines that the target printer has the capability of processing the tamper detection job after the inquiry (YES in STEP S602), the process proceeds to STEP S603. At STEP S603, the management console 405 sets a value of SecureJob for the target printer at TRUE. Then, the process returns to STEP S602. Otherwise (NO in STEP S602), the process proceeds to STEP 604, and the management console 405 sets the value of SecureJob at FALSE.

As described above, the exemplary embodiments of the present invention allow the printing system to switch the format of the print job into a normal one and to restrict the printing functions in a case where the printer incapable of processing the print job in the tamper detectable format performs the printing operation or under a circumstance where the print job in the tamper detectable format cannot be utilized. This advantageously frees users from a work for installing additional printer drivers and programs and from a setting work.

In addition, the printing systems according to the exemplary embodiments can automatically reflect information about the capability of processing the tamper detection job of printers in the systems in the print right token information table. This advantageously allows system administrators to manage the setting regarding the format of the print job, i.e., the setting indicating whether the print job is in the tamper detectable format, at low cost in an integrated fashion.

Each of the processing functions of the host computer 401, the SA server 402, the printer 403, the directory server 404, and the management console 405 according to the above-described exemplary embodiments of the present invention is realized by the central processing unit (CPU) reading out programs for realizing each processing function from a memory and executing the programs. However, the present invention is not limited to this particular configuration, and all of or some of the processing functions may be realized by dedicated hardware. In addition, the above-described memory may be a nonvolatile memory such as a magneto-optical disk or a flash memory, a read only recording medium such as a CD-ROM, a volatile memory except for a RAM, or a computer-readable/writable recording medium constituted by combinations thereof.

Additionally, programs for realizing each of the functions of the host computer 401, the SA server 402, the printer 403, the directory server 404, and the management console 405 may be recorded on a computer-readable recording medium. The functions may be realized by installing the programs recorded on the recording medium in the computer system and executing the programs. In addition, a term "computer system" used herein includes not only OS but also hardware such as peripheral devices. More specifically, the program read out from the recording medium may be written in a memory included in a function expansion board inserted into a computer or a memory included in a function expansion unit connected to a computer. Then, on the basis of instructions of the programs, a CPU or the like included in the function expansion board or the function expansion unit executes some or all of the processing operations, and the functions of the above-described exemplary embodiments may be realized by the processing operations.

In addition, types of the "computer-readable recording medium" include a removable medium such as a flexible disk, a magneto-optical disk, a ROM, or a CD-ROM, and a storage device such as a hard disk included in the computer system. Furthermore, the "computer-readable recording medium" also includes a recording medium that holds programs for a predetermined period, such as a volatile memory (e.g., RAM) included in a computer system serving as a server or a client when the programs are sent through a network such as the Internet and a communication line such as a telephone line.

Additionally, the above-described programs may be transmitted to other computer system from a computer system that has stored the programs in a storage device or the like via a transmission medium or a carrier wave in the transmission medium. Here, the "transmission medium" used for transmitting the programs indicates a medium capable of conveying information, e.g., a network (i.e., a communication network) such as the Internet or a communication line (i.e., a communication wire) such as a telephone line.

In addition, the programs may be those for realizing some of the above-described functions. Furthermore, the programs may be those for realizing the above-described functions in cooperation with programs prestored in the computer system. That is, the programs may be so-called differential files (i.e., differential programs).

Moreover, a program product such as a computer-readable recording medium storing the above-described programs may be employed as an exemplary embodiment of the present invention. The above-described programs, the recording medium, the transmission medium, and the program product are also included in a scope of the present invention.

While the exemplary embodiments of the present invention have been described with reference to the accompanying drawings, it is to be understood that specific configurations are not limited to these exemplary embodiments, and configurations made without departing from the spirit of the present invention are also within the scope of the present invention.

The scope of the following claims is to be accorded the broadest interpretation so as to encompass all modifications, equivalent structures and functions.

This application claims the benefit of Japanese Application No. 2006-099618 filed Mar. 31, 2006, which is hereby incorporated by reference herein in its entirety.

What is claimed is:

1. An information processing apparatus connectable to a data output apparatus through a communication line, the information processing apparatus comprising:
  an acquiring unit configured to acquire output data to be output by the data output apparatus;
  a token acquiring unit configured to acquire a print right token, wherein the print right token includes processing capability information regarding a processing capability of the data output apparatus and restriction information for restricting an output process of the output data;
  a generation unit configured to generate a combination data which is generated by using the output data and the restriction information;
  a determination unit configured to determine whether or not the data output apparatus is capable of processing a tamper detectable format based on the processing capability information included in the acquired print right token;
  a converting unit configured to convert, if the determination unit determines that the data output apparatus is capable of processing the tamper detectable format, a format of the combination data generated by the generation unit into the temper detectable format; and
  a sending unit configured to send the combination data, the format of which has been converted by the converting unit, to the data output apparatus,
  wherein a tampering detection of the restriction information is enabled in the data output apparatus in accordance with the combination data of the tamper detectable format, and
  wherein if the determination unit determines that the data output apparatus is not capable of processing the tamper detectable format, the sending unit sends the combination data generated by the generation unit to the data output apparatus without the format conversion by the converting unit.

2. The information processing apparatus according to claim 1, wherein the data output apparatus comprises a printing apparatus and the output data comprises print data.

3. The information processing apparatus according to claim 2, wherein the print data and the restriction information are acquired by the acquiring unit in response to a user input requesting printing of the print data.

4. The information processing apparatus according to claim 1,
wherein the token acquiring unit acquires the print right token from a management apparatus that is connectable to the information processing apparatus and the data output apparatus through the communication line and acquires the information regarding the processing capability from the data output apparatus.

5. A system comprising:
a data output apparatus; and
an information processing apparatus including:
an acquiring unit configured to acquire output data to be output by the data output apparatus
a token acquiring unit configured to acquire a print right token, wherein the print right token includes processing capability information regarding a processing capability of the data output apparatus and restriction information for restricting an output process of the output data,
a generation unit configured to generate a combination data which is generated by using the output data and the restriction information;
a determination unit configured to determine whether or not the data output apparatus is capable of processing a tamper detectable format based on the processing capability information included in the acquired print right token;
a converting unit configured to convert, if the data output apparatus is capable of processing a tamper detectable format, a format of the combination data generated by the generation unit into the tamper detectable format; and
a sending unit configured to send the combination data, the format of which has been converted by the converting unit, to the data output apparatus,
wherein the data output apparatus and the information processing apparatus are connected through a communication line, and
wherein if the data output apparatus enables a tampering detection of the restriction information in accordance with the combination data of the tamper detectable format.

6. A method for an information processing apparatus connectable to a printing apparatus through a communication line, the method comprising:
acquiring print data to be printed by the printing apparatus;
acquiring a print right token, wherein the print right token includes processing capability information regarding a processing capability of the data output apparatus and restriction information for restricting an output process of the print data;
generating a combination data which is generated by using the output data and the restriction information;
determining whether or not the data output apparatus is capable of processing a taper detectable format based on the processing capability information included in the acquired print right token;
converting, if it is determined that the data output apparatus is capable of processing the taper detectable format, a format of the combination data into the tamper detectable format; and
sending the combination data, the format of which has been converted, to the printing apparatus,
wherein a tapering detection of the restriction information is enabled in the data output apparatus in accordance with the combination data of the tamper detectable format, and wherein, if it is determined that the data output apparatus is not capable of processing the tamper detectable format, the generated combination data is sent to the data output apparatus without the format conversion.

7. The method according to claim 6, wherein the print data comprise PDL data, and the restriction information comprises a print right token.

8. The method according to claim 7, wherein the format of the PDL data combined with the print right token is converted into a tamper detectable format if the printing apparatus is determined to be capable of processing a print job in the tamper detectable format.

9. The method according to claim 6, wherein the information regarding the processing capability is information regarding a processing capability of detecting tampering of the restriction information of the printing apparatus, and wherein
the format of the print data and restriction information is converted into an information tamper detectable format according to the processing capability of detecting tampering of the restriction information of the data output apparatus.

10. The method according to claim 6,
wherein the print right token is acquired from a management apparatus that is connectable to the information processing apparatus and the printing apparatus through the communication line and acquires the information regarding the processing capability from the printing apparatus.

11. A system comprising:
a data output apparatus; and
an information processing apparatus performing a method including
acquiring output data to be output by the data output apparatus;
acquiring a print right token, wherein the print right token includes processing capability information regarding a processing capability of the data output apparatus and restriction information for restricting an output process of the output data,
generating a combination data which is generated by using the output data and the restriction information;
determining whether or not the data output apparatus is capable of processing a tamper detectable format based on the processing capability information included in the acquired print right token;
converting, if it is determined that the data output apparatus is capable of processing the tamper detectable format, a format of the combination data generated at the generating step into the tamper detectable format, and
sending the combination data, the format of which has been converted at the step of converting, to the data output apparatus,
wherein a tampering detection of the restriction information is enabled in the data output apparatus in accordance with the combination data of the tamper detectable format,
wherein if the it is determined that the data output apparatus is not capable of processing the tamper detectable format, the generated combination data is sent to the data output apparatus without the format conversion, and
wherein the data output apparatus and the information processing apparatus are connected through a communication line.

12. A non-transitory computer-readable medium storing instructions which, when executed by an information processing apparatus, cause the information processing apparatus to perform operations comprising:
  acquiring print data to be printed by a printing apparatus;
  acquiring a print right token, wherein the print right token includes processing capability information regarding a processing capability of the data output apparatus and restriction information for restricting an output process of the print data;
  generating a combination data which is generated by using the output data and the restriction information acquired;
  determining whether or not the data output apparatus is capable of processing a taper detectable format based on the processing capability information included in the acquired print right token;
  converting, if it is determined that the data output apparatus is capable of processing the taper detectable format, a format of the combination data into the tamper detectable format; and
  sending the combination data, the format of which has been converted, to the printing apparatus,
  wherein a tampering detection of the restriction information is enabled in the data output apparatus in accordance with the combination data of the tamper detectable format, and
  wherein, if it is determined that the data output apparatus is not capable of processing the tamper detectable format, the generated combination data is sent to the data output apparatus without the format conversion.

13. The non-transitory computer-readable medium according to claim 12, wherein the print data comprise PDL data, and the restriction information comprises a print right token.

14. The non-transitory computer-readable medium according to claim 13, wherein the format of the PDL data combined with the print right token is converted into a tamper detectable format if the printing apparatus is determined to be capable of processing a print job in the tamper detectable format.

* * * * *